US010128551B2

(12) United States Patent
Roev et al.

(10) Patent No.: US 10,128,551 B2
(45) Date of Patent: Nov. 13, 2018

(54) ELECTROLYTE FOR LITHIUM AIR BATTERY AND LITHIUM AIR BATTERY INCLUDING THE SAME

(71) Applicant: SAMSUNG ELECTRONICS CO., LTD., Suwon-si, Gyeonggi-do (KR)

(72) Inventors: Victor Roev, Suwon-si (KR); Hyunjin Kim, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 14 days.

(21) Appl. No.: 15/349,412

(22) Filed: Nov. 11, 2016

(65) Prior Publication Data

US 2017/0149091 A1 May 25, 2017

(30) Foreign Application Priority Data

Nov. 20, 2015 (KR) ........................ 10-2015-0163358
Nov. 10, 2016 (KR) ........................ 10-2016-0149566

(51) Int. Cl.
*H01M 12/08* (2006.01)
*H01M 4/38* (2006.01)

(52) U.S. Cl.
CPC ........... *H01M 12/08* (2013.01); *H01M 4/382* (2013.01); *H01M 2300/0028* (2013.01); *H01M 2300/0037* (2013.01); *H01M 2300/0045* (2013.01); *H01M 2300/0068* (2013.01); *H01M 2300/0071* (2013.01); *Y02E 60/128* (2013.01)

(58) Field of Classification Search
CPC ......... H01M 10/0566; H01M 10/0567; H01M 10/0568; H01M 2220/20; H01M 2300/0028; H01M 2300/0037; H01M 6/08; H01M 6/164; H01M 12/06
See application file for complete search history.

(56) References Cited

U.S. PATENT DOCUMENTS

| | | | | |
|---|---|---|---|---|
| 3,966,781 A * | 6/1976 | Atkinson | ................. | C07B 31/00 554/161 |
| 5,166,009 A * | 11/1992 | Abraham | ................ | H01B 1/122 252/62.2 |
| 8,501,339 B2 * | 8/2013 | Visco | ................... | H01M 2/1673 429/126 |
| 2004/0180224 A1 * | 9/2004 | Thorp | ..................... | B82Y 10/00 428/457 |
| 2010/0248078 A1 | 9/2010 | Beard | | |
| 2012/0082890 A1 * | 4/2012 | Dong | ..................... | H01G 9/038 429/188 |
| 2014/0023940 A1 * | 1/2014 | Zaghib | .................. | H01M 4/134 429/405 |
| 2014/0091255 A1 * | 4/2014 | Kim | ..................... | C01G 23/005 252/182.1 |
| 2014/0134502 A1 | 5/2014 | Kang et al. | | |
| 2015/0064578 A1 * | 3/2015 | Kang | ................ | H01M 10/0567 429/341 |
| 2015/0104716 A1 | 4/2015 | Kang et al. | | |

FOREIGN PATENT DOCUMENTS

| | | |
|---|---|---|
| JP | 2007-084469 A | 4/2007 |
| JP | 2015-018718 A | 1/2015 |
| KR | 10-2015-0042091 A | 4/2015 |
| KR | 10-2015-0061903 A | 6/2015 |

OTHER PUBLICATIONS

Ethyl acetate-d8, Sigma-Aldrich, 2018 (Year: 2018).*
Petibon, R., Li, J., Sharma, N., Pang, W.K., Peterson, V.K., Dahn, J.R.—The use of deuterated ethyl acetate in highly concentrated electrolyte as a low-cost solvent for in situ neutron diffraction measurements of Li-ion battery electrodes, Electrochimica Acta, 174 (2015), pp. 417-423 (Year: 2015).*
Mao, G., Saboungi, M.L., Price, D.L., Badyal, Y.S., Fischer, H.E.—Lithium environment in PEO-LiClO4 polymer electrolyte, Europhys. Lett. 54(3), 2001 (Year: 2001).*
Johnson, J.A., Saboungi, M.-L., Price, D.L., Ansell, S.—Atomic structure of solid and liquid polyethylene oxide, Journal of Chemical Physics, vol. 109, No. 16, pp. 7005-7010, Oct. 22, 1998 (Year: 1998).*
Daniel Sharon et al. "Oxidation of Dimethyl Sulfoxide Solutions by Electrochemical Reduction of Oxygen", J. Phys. Chem. Lett. 2013, 4, 3115-3119.
Daniel Sharon et al. "Reactivity of Amide Based Solutions in Lithium-Oxygen Cells", J. Phys. Chem. C 2014, 118, 15207-15213.
Dong Zheng et al. "Preferential Solvation of Lithium Cations and Impacts on Oxygen Reduction in Lithium-Air Batteries", ACS Appl. Mater. Interfaces 2015, 7, 19923-19929.
G. Q. Zhang et al. "Lithium-Air Batteries Using SWNT/CNF Buckypapers as Air Electrodes", Journal of the Electrochemical Society, 157 (8) A953-A956 (2010).
Hee-Dai Lim et al. "A new catalyst-embedded hierarchical air electrode for high-performance Li-O2 batteries", Energy Environ. Sci. (2013), 6, 3570-3575.
Sung Man Cho et al. "Pd3C0/MWCNTs Composite Electro-Catalyst Cathode Material for Use in Lithium-Oxygen Batteries", Journal of The Electrochemical Society, 162 (12) A2236-A2244 (2015).
Vincent Giordani et al. "N-methylacetamide as an Electrolyte Solvent for Rechargeable Li-O2 Batteries: Unexpected Stability at the O2 electrode", ECS Electrochemistry Letters, (2014), 3(1) A11-A14.
Yi-Chun Lu et al. "Platinum-Gold Nanoparticles: A Highly Active Bifuctional Electrocatalyst for Rechargeable Lithium-Air Batteries", J. Am. Chem. Soc. 2010, 132, 12170-12171.
Yi-Chun Lu et al. "The Influence of Catalysts on Discharge and Charge Voltages of Rechargeable Li-Oxygen Batteries", Electrochemical and Solid-State Letters, 13(6), A69-A72 (2010).

(Continued)

*Primary Examiner* — Anca Eoff
(74) *Attorney, Agent, or Firm* — Cantor Colburn LLP

(57) ABSTRACT

An electrolyte for a lithium air battery including a deuterated compound, wherein the deuterated compound is a deuterated product of an organic compound, in which at least one hydrogen atom is substituted with a deuterium atom, wherein the organic compound has a carbon-hydrogen (C—H) bond dissociation energy of 337.2 kJ/mol or more.

22 Claims, 3 Drawing Sheets

(56) References Cited

OTHER PUBLICATIONS

Yu-Ran Luo "Bond Dissociation Energies" in Handbook of Bond Dissociation Energies in Organic Compounds, CRC Press, Feb. 23, 2010, 34 pp.

* cited by examiner

ELECTROLYTE FOR LITHIUM AIR BATTERY AND LITHIUM AIR BATTERY INCLUDING THE SAME

CROSS-REFERENCE TO RELATED APPLICATION

This application claims priority to Korean Patent Application No. 10-2015-0163358, filed on Nov. 20, 2015 and Korean Patent Application No. 10-2016-0149566, filed on Nov. 10, 2016, and all the benefits accruing therefrom under 35 U.S.C. § 119, the contents of which are incorporated herein in their entireties by reference.

BACKGROUND

1. Field

The present disclosure relates to electrolytes for lithium air batteries and lithium air batteries including the same.

2. Description of the Related Art

A lithium air battery generally includes an anode, a cathode using air oxygen as a cathode active material and including a catalyst for oxidation/reduction of oxygen, and a lithium ion conductive electrolyte disposed between the cathode and the anode.

Lithium air batteries have a theoretical energy density approximately 10 times greater than the density of lithium ion batteries. In addition, the lithium air batteries are environmentally friendly and have higher safety than lithium ion batteries. Thus, the development of lithium air batteries has been actively pursued. Lithium air batteries may use non-aqueous electrolytes or aqueous electrolytes as a lithium ion conductive medium.

During battery discharging, lithium derived from an anode comes in contact with oxygen introduced from a cathode, thus, forming lithium oxide ($Li_2O_2$). However, lithium oxide, which is an insulator, is unstable and may react with an electrolyte. In addition, when the lithium air battery is charged at a high voltage and in an oxygen gas atmosphere, the electrolyte becomes substantially decomposed, thereby deteriorating the battery performance. Therefore, there is a need to develop a method for addressing these stability problems.

SUMMARY

Provided are electrolytes for lithium air batteries with enhanced stability.

Provided are lithium air batteries having enhanced cycle characteristics that use the electrolytes described above.

Additional aspects will be set forth in part in the description which follows and, in part, will be apparent from the description, or may be learned by practice of the presented embodiments.

According to an aspect of an embodiment, an electrolyte for a lithium air battery includes a deuterated compound, wherein the deuterated compound is a deuterated product of an organic compound, in which at least one hydrogen atom is substituted with a deuterium atom, wherein the organic compound has a carbon-hydrogen (C—H) bond dissociation energy of 337.2 kilojoules per mole or more.

According to an aspect of another embodiment, a lithium air battery includes an anode, a cathode, and at least one selected from the electrolyte described above and a reaction product thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
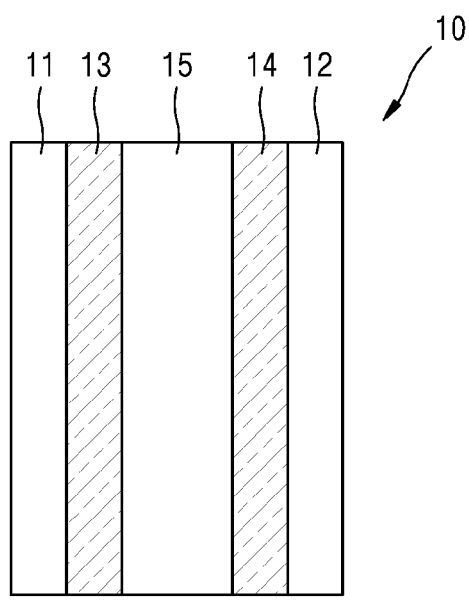
FIG. 1A is a schematic view of a lithium air battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, an electrolyte for a lithium air battery, according to an embodiment, and a lithium battery including the same will be described in more detail.

An electrolyte for a lithium air battery, according to an embodiment includes a deuterated compound, a deuterated product of an organic compound, in which at least one hydrogen atom of an organic compound is substituted with a deuterium atom, wherein the organic compound has a carbon-hydrogen (C—H) bond dissociation energy of 337.2 kilojoules per mole (kJ/mol) or more.

The term "deuterated compound" as used herein refers to an organic compound, hydrogen atoms of which are partially or completely deuterated. The deuterium substitution degree of the organic compound may be from about 50% to about 100%, for example, from about 60% to about 100%, for example, from about 70% to about 100%, or for example, from about 80% to about 100%.

When a general cathode electrolyte is used in a lithium air battery, it is difficult to effectively suppress a side reaction at a cathode. Thus, an electrolyte capable of effectively suppressing a cathode side reaction is desired.

Cathode side reactions are generally related to proton abstraction from an electrolyte and auto-oxidation.

Therefore, the inventors of the present application have discovered an electrolyte for lithium air batteries, which is capable of effectively suppressing reactivity of protons and reaction rates of proton abstraction and auto-oxidation at a cathode due to inclusion of the deuterated compound described above as an additive.

As described above, C—H bonds are relatively stable when the C—H bond dissociation energy of the organic compound is 337.2 kJ/mol or more, for example, 339.6 kJ/mol or more. Such C—H bonds are stronger than bonds adjacent thereto (e.g., C(=O)—N bond and the like). When an organic compound having such C—H bonds, at least one hydrogen atom of which is substituted with a deuterium atom, is used as an electrolyte additive, the reactivity of protons significantly decreases, and processes of proton abstractions and auto-oxidations at a cathode are considerably slow. As a result, cathode side reactions occur in a much smaller degree, and thus, the cathode has a higher stability.

The deuterated compound may be, for example, at least one compound selected from a deuterated amide of a carboxylic acid, containing at least one $C_1$-$C_{10}$ optionally deuterated N-alkyl group (such as deuterated N,N-dimethylacetamide, deuterated N-methylacetamide, or the like), a deuterated glyme-based compound of general formula R(OCH$_2$CH$_2$)$_m$OR (wherein each R is the same or different and is each independently an optionally deuterated $C_1$-$C_{10}$ alkyl group and m is an integer of 1 to 10), a substituted or unsubstituted deuterated polyethyleneoxide, and a deuterated compound represented by Formula 1 below:

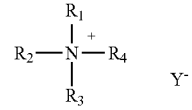

Formula 1 wherein
each of $R_1$ to $R_4$ is independently a hydrogen atom, a deuterium atom, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkoxyalkyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ aryloxyalkyl group, a substituted or unsubstituted $C_7$-$C_{30}$ arylalkyl group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ heteroaryloxyalkyl group, a substituted or unsubstituted $C_4$-$C_{30}$ heteroarylalkyl group, a substituted or unsubstituted $C_4$-$C_{30}$ cycloalkyl group, or a substituted or unsubstituted $C_3$-$C_{30}$ heterocycloalkyl group;
$R_1$ and $R_2$ or $R_3$ and $R_4$ are optionally linked to each other to form a ring;
Y is an anion; and
at least one of $R_1$ to $R_4$ is substituted with a deuterium atom.

In Formula 1, $Y^-$ is selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(FSO_2)_2N^-$, $(C_2F_5SO_2)(CF_3SO_2)N-$, and $(CF_3SO_2)_2N^-$.

An electrolyte according to an embodiment includes the deuterated compound described above, and thus, may have a great kinetic isotope effect (KIE) and therefore, a very high stability. In this regard, the KIE may be represented as a change in the ratio of a reaction rate $K_L$ to a reaction rate $K_H$, expressed in Equation 1 below. Here, $K_L$ is a reaction rate of a compound having a C—H bond dissociation energy of 337.2 kJ/mol or more, and $K_H$ is a reaction rate of a compound having a C—H bond dissociation energy of 337.2 kJ/mol or more, at least one hydrogen atom of which is substituted with a deuterium atom.

KIE=$K_L/K_H$     Equation 1

When the electrolyte including the deuterated compound is used, reaction rates dramatically decrease as compared to when the compound having a C—H bond dissociation energy of 337.2 kJ/mol or more without a deuterium atom is used. As a result, the KIE increases.

According to an embodiment, the deuterated compound may be deuterated N,N-dimethylacetamide or deuterated N-methylacetamide. These compounds are more stable than deuterated dimethyl sulfoxide, and an electrolyte including such a compound has a much higher stability than an electrolyte including deuterated dimethyl sulfoxide. A reason for the much higher stability of the electrolyte including such a compound will be described as below, but is not limited to the following theory.

In dimethyl sulfoxide, a sulfur-carbon (S—C) bond has a relatively low bond dissociation energy, e.g., about 221 kJ/mol and a C—H bond adjacent to the S—C bond is relatively stable as compared to the S—C bond. When deuterium is introduced into dimethyl sulfoxide, the introduction effect is insignificant.

By contrast, in N,N-dimethylacetamide or formamide, a carbon-nitrogen (C—N) bond is relatively very stable. For example, formamide is highly stable since the C—N bond has a very high bond dissociation energy, e.g., about 410 kJ/mol or more. In this regard, a C—H bond adjacent to the C—N bond is relatively unstable as compared to the C—N bond. Thus, in these compounds, an effect of substituting a hydrogen atom of the C—H bond, adjacent to the C—N bond, with deuterium is very significant as compared to when deuterium is introduced into dimethyl sulfoxide.

The electrolyte has enhanced oxidation resistance and oxygen affinity and accordingly, is highly stable. The term "oxidation" as used herein refers to oxidation of the electrolyte at an electrode due to a potential difference or oxidation by reaction between the electrolyte and a material produced by oxidation of lithium ions. The term "oxygen affinity" as used herein refers to an ability of the electrolyte to transmit oxygen.

The deuterated glyme-based compound may be, for example, at least one compound selected from deuterated dimethoxy ethane, deuterated ethylene glycol dimethyl ether ($CH_3OCH_2CH_2OCH_3$: glyme), deuterated diethylene glycol dimethyl ether ($CH_3(OCH_2CH_2)_2OCH_3$: diglyme), deuterated diethylene glycol diethyl ether ($C_2H_5(OCH_2CH_2)_2OC_2H_5$), deuterated triethylene glycol dimethyl ether ($CH_3(OCH_2CH_2)_3OCH_3$), and deuterated triethylene glycol diethyl ether ($C_2H_5(OCH_2CH_2)_3OC_2H_5$).

For example, the deuterated N,N-dimethylacetamide may be at least one selected from $CD_3CON(CD_3)_2$, $CH_3CON(CD_3)_2$, $CHD_2CON(CD_3)_2$, $CH_2DCON(CD_3)_2$, $CH_3CON(CD_3)(CH_3)$, $CH_3CON(CD_2H)(CH_3)$, $CH_3CON(CDH_2)(CH_3)$, $CH_3CON(CD_2H)_2$, $CH_3CON(CDH_2)_2$, $CHD_2CON(CD_3)(CH_3)$, $CHD_2CON(CD_2H)(CH_3)$, $CHD_2CON(CDH_2)(CH_3)$, $CHD_2CON(CD_2H)_2$, $CH_3CON(CDH_2)_2$, $CH_2DCON(CD_3)(CH_3)$, $CH_2DCON(CD_2H)(CH_3)$, $CH_2DCON(CDH_2)(CH_3)$, $CH_2DCON(CD_2H)_2$, $CD_3CON(CH_3)_2$, $CD_3CON(CDH_2)(CH_3)$, $CD_3CON(CDH_2)_2$, $CD_3CON(CD_3)(CH_3)$, and $CH_2DCON(CDH_2)_2$.

In the deuterated N,N-dimethylacetamide described above, when a hydrogen atom of the C—H bond directly adjacent to C(=O)—N is substituted with a deuterium atom, a greater effect of enhancing oxidation resistance is obtained. In addition, when comparing oxidation resistances of $CD_3CON(CD_3)_2$, $CH_3CON(CD_3)_2$, and $CD_3CON(CH_3)_2$ with one another, $CD_3CON(CD_3)_2$ has the highest oxidation resistance, $CH_3CON(CD_3)_2$ has a lower oxidation resistance than $CD_3CON(CD_3)_2$, and $CD_3CON(CH_3)_2$ has the lowest oxidation resistance.

The deuterated compound of Formula 1 includes a cation selected from groups represented by Formula 2 below:

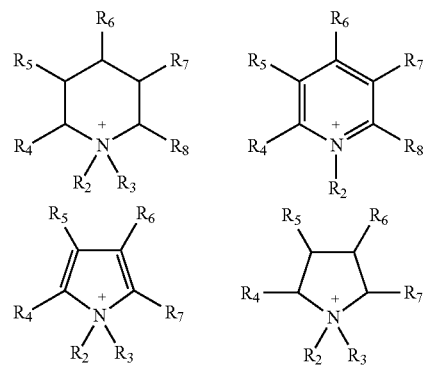

Formula 2 wherein in Formula 2,
each of $R_2$ to $R_8$ is independently a hydrogen atom, a deuterium atom, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkoxyalkyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ aryloxyalkyl group, a substituted or unsubstituted $C_7$-$C_{30}$ arylalkyl group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ heteroaryloxyalkyl group, a substituted or unsubstituted $C_4$-$C_{30}$ heteroarylalkyl group, a substituted or unsubstituted $C_4$-$C_{30}$ cycloalkyl group, or a substituted or unsubstituted $C_3$-$C_{30}$ heterocycloalkyl group; and
at least one of $R_2$ to $R_8$ is substituted with a deuterium atom.

In the electrolyte, the amount of the deuterated compound may be from about 3 parts by weight to about 95 parts by weight, for example, from about 15 parts by weight to about 94 parts by weight with respect to the total weight 100 parts by weight of the electrolyte. For example, the amount of the deuterated compound may be from about 18.8 parts by weight to about 94 parts by weight, with respect to the total weight 100 parts by weight of the electrolyte. While not wishing to be bound by theory, it is understood that when the amount of the deuterated compound is within the ranges described above, the electrolyte has high stability and a lithium air battery having high cathode rechargeability may be manufactured using the deuterated compound.

The deuterated compound of Formula 1 may be, for example, a deuterated product of a compound including: at least one cation selected from tetramethyl ammonium cation, tetraethyl ammonium cation, trimethylpropyl ammonium cation, $N_7$N-diethyl-N-methyl-N-(2-methoxyethyl) ammonium cation, N-ethyl-N,N-dimethyl-N-(2-methoxyethyl)ammonium cation, 1-butyl-1-methylpyrrolidinium cation, 1-methyl-1-(2-methoxyethyl) pyrrolidinium cation, 1-methyl-1-(3-methoxypropyl) pyrrolidinium cation, 1-methyl-1-pentylpyrrolidinium cation, N-propyl-N-methylpyrrolidinium cation, N-propyl-N-methylpiperidinium cation, and N-ethyl-N-methylpiperidinium cation; and at least one anion selected from $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

The deuterated compound includes a mixture of N, N-dimethylacetamide and deuterated N,N-dimethylacetamide. In this regard, the deuterated N, N-dimethylacetamide has a deuterium substitution degree of about 50% to about 100%, for example, about 60% to about 100%, for example, about 70% to about 100%, for example, about 80% to about 100%, for example, about 90% to about 100%, or for example, about 95% to about 100%.

According to another embodiment, the amount of the deuterated N,N-dimethylacetamide in the mixture described above may be from about 0.1 parts by volume to about 99.99 parts by volume, for example, from about 20 parts by volume to about 80 parts by volume, with respect to the total volume (100 parts by volume) of the deuterated N,N-dimethylacetamide and N,N-dimethylacetamide.

The electrolyte may further include a lithium salt.

The lithium salt dissolved in an organic solvent may serve as a lithium ion source in a battery, and for example, may accelerate transfer of lithium ions at an anode and between a lithium ion conductive electrolyte membrane and the anode.

The lithium salt may be at least one lithium salt selected from $LiNO_3$, $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiF, LiBr, LiCl, LiOH, LiI, $LiB(C_2O_4)_2$ (lithium bis(oxalato) borate; LiBOB), $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ wherein p and q are different numbers and are each independently an integer of 1 to 20, $LiN((SO_2)_2C_pF_{2p})$ wherein p is an integer of 1 to 10, $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$ wherein p is an integer of 1 to 10, and $LiN(C_{10}F_7SO_2)(C_pF_{2p+1}SO_2)$ wherein p is an integer of 1 to 10.

The amount of the lithium salt may be from about 0.01 molar (M) to about 10 M, for example, from about 0.1 M to about 2.0 M. While not wishing to be bound by theory, it is understood that when the amount of the lithium salt is within the ranges described above, the electrolyte has appropriate conductivity and viscosity, and thus, may exhibit excellent performance, and the lithium ions may effectively transfer.

The electrolyte may further include other metal salts in addition to the lithium salt and the other metal salts may be, for example, $AlCl_3$, $MgCl_2$, NaCl, KCl, NaBr, KBr, $CaCl_2$, and the like.

The electrolyte may further include a non-aqueous organic solvent. The non-aqueous organic solvent may be a carbonate-based solvent, an ester-based solvent, an ether-based solvent, a ketone-based solvent, an amine-based solvent, or a phosphine-based solvent. Non-limiting examples of the carbonate-based solvent include dimethyl carbonate (DMC), diethyl carbonate (DEC), ethyl methyl carbonate (EMC), dipropyl carbonate (DPC), methyl propyl carbonate (MPC), ethyl propyl carbonate (EPC), methyl ethyl carbonate (MEC), ethylene carbonate (EC), propylene carbonate (PC), and butylene carbonate (BC).

The ester-based solvent may be methyl acetate, ethyl acetate, n-propyl acetate, dimethyl acetate, methyl propionate, ethyl propionate, γ-butyrolactone, decanolide, valerolactone, mevalonolactone, caprolactone, or the like.

The ether-based solvent may be dibutyl ether, tetraglyme, diglyme, dimethoxyethane, 2-methyltetrahydrofuran, tetrahydrofuran, or the like, and the ketone-based solvent may be cyclohexanone or the like.

In addition, the amine-based solvent may be triethylamine, triphenylamine, or the like. The phosphine-based solvent may be triethylphosphine or the like. However, the non-aqueous organic solvents are not limited to the above examples and any aprotic solvent used in the art may be used.

In addition, the aprotic solvent may be a nitrile-based solvent having the formula R—CN wherein R is a linear, branched or cyclic $C_2$-$C_{30}$ hydrocarbon group. The solvent may include a double bond, an aromatic ring, or an ether bond. The solvent may be an amide such as dimethylformamide and the like, a dioxolane such as 1,3-dioxolane and the like, a sulfolane, or the like.

The above-listed aprotic solvents may be used alone or at least one of these aprotic solvents may be used in combination with other solvent(s). In this regard, a mixing ratio of at least one of these aprotic solvents may be appropriately adjusted according to battery performance and is apparent to one of ordinary skill in the art.

The non-aqueous organic solvent may be, for example, at least one selected from N,N-dimethylacetamide, N-methylacetamide dimethyl sulfoxide, methyl butyl ether, diethyl ether, ethyl butyl ether, dibutyl ether, polyethylene glycol dimethyl ether, tetraethylene glycol dimethyl ether, cyclohexanone, dioxane, dimethoxy ethane, 2-methyltetrahydrofuran, 2,2-dimethyltetrahydrofuran, 2,5-dimethyltetrahydrofuran, tetrahydrofuran, methyl acetate, ethyl acetate, n-propyl acetate, dimethyl acetate, methyl propionate, ethyl propionate, methyl formate, ethyl formate, dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate, γ-butyrolactone, decanolide, valerolactone, mevalonolactone, caprolactone, diglyme, triglyme, tetraglyme, acetonitrile, benzonitrile, nitromethane, nitrobenzene, triethyl amine, triphenyl amine, tetraethylene glycol diamine, dimethylformamide, diethylformamide, N-methylpyrrolidone, dimethyl sulfone, tetramethylene sulfone, triethylphosphine oxide, 1,3-dioxolane, and sulfolane.

According to another embodiment, a lithium air battery includes an anode, a cathode, and the electrolyte including the deuterated compound of Formula 1, which is disposed between the anode and the cathode.

The lithium air battery may further include a lithium ion conductive layer including a plurality of ion conductive inorganic particles, disposed between the anode and the electrolyte.

The ion conductive inorganic particles may be at least one selected from a glassy active metal ion conductor, an amorphous active metal ion conductor, a ceramic active metal ion conductor, and a glass-ceramic active metal ion conductor.

The ion conductive inorganic particles may be, for example, at least one selected from $Li_{1+x+y}Al_xTi_{2-x}Si_yP_{3-y}O_{12}$ wherein $0<x<2$ and $0\le y<3$, $BaTiO_3$, $Pb(Zr,Ti)O_3$ (PZT), $Pb_{1-x}La_xZr_{1-y}Ti_yO_3$ (PLZT) wherein $0\le x<1$ and $0\le y<1$, $PB(Mg_3Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$ wherein $0<x<2$ and $0<y<3$), lithium aluminum titanium phosphate ($Li_xAl_yTi_z(PO_4)_3$ wherein $0<x<2$, $0<y<1$, and $0<z<3$), $Li_{1+x+y}(Al, Ga)_x(Ti, Ge)_{2-x}Si_yP_{3-y}O_{12}$ wherein $0\le x\le 1$ and $0\le y\le 1$, lithium lanthanum titanate ($Li_xLa_yTiO_3$ wherein $0<x<2$ and $0<y<3$), lithium germanium thiophosphate ($Li_xGe_yP_zS_w$ wherein $0<x<4$, $0<y<1$, $0<z<1$, and $0<w<5$), lithium nitride ($Li_xN_y$ wherein $0<x<4$ and $0<y<2$), $SiS_2$ ($Li_xSi_yS_z$)-based glass wherein $0<x<3$, $0<y<2$, and $0<z<4$, $P_2S_5$($Li_xP_yS_z$)-based glass wherein $0<x<3$, $0<y<3$, and $0<z<7$, $Li_2O$, LiOH, $Li_2CO_3$, $LiAlO_2$, $Li_2O$—$Al_2O_3$—$SiO_2$—$P_2O_5$—$TiO_2$—$GeO_2$-based ceramics, and Garnet-based ceramics ($Li_{3+x}La_3M_2O_{12}$ wherein $0\le x\le 5$ and M=Te, Nb, or Zr).

The lithium air battery may further include a second electrolyte disposed between the anode and the lithium ion conductive layer. In this regard, the second electrolyte may be, for example, a solid polymer electrolyte or an inorganic solid electrolyte.

FIG. 1A is a schematic view of a lithium air battery 10 according to an embodiment. Referring to FIG. 1, the lithium air battery 10 includes a first current collector 11, a second current collector 12, a cathode 13, an anode 14, and an electrolyte 15 (hereinafter, referred to as a first electrolyte) including the compound of Formula 1 described above, which is disposed between the cathode 13 and the anode 14. The cathode 13, which is formed on the first current collector 11, uses oxygen as an active material to induce the redox reaction of oxygen. The anode 14 is formed on the second current collector 12 and induces the redox reaction of lithium metal. The first electrolyte 15 enables conduction of lithium ions between the cathode 13 and the anode 14.

A porous structure having a net or mesh shape may be used as the first and second current collectors 11 and 12 to facilitate diffusion of oxygen. A porous metal plate made of, for example, stainless steel, nickel, aluminum, or the like may be used as the first and second current collectors 11 and 12. Materials for the first and second current collectors 11 and 12 are not limited to the above examples, and any material for current collectors used in the art may be used. In some embodiments, the first and second current collectors 11 and 12 may be coated with an anti-oxidative metal or alloy to prevent oxidation.

The cathode 13 that uses oxygen as a cathode active material may be formed of a porous conductive material. Thus, any material with porosity and conductivity may be used as a material for forming the cathode 13 and may be, for example, a carbonaceous material with porosity. Examples of the carbonaceous material include carbon blacks, graphites, graphenes, activated carbons, carbon nanotubes, and carbon fibers. In addition, a metallic conductive material, such as a metal fiber or a metal mesh may be used as a material for forming the cathode 13. The cathode active material for the cathode 13 may be a metal powder formed of copper, silver, nickel, aluminum, or the like. In addition, an organic conductive material such as a polyphenylene derivative may be used as the cathode active material for the cathode 13. The above-listed conductive materials may be used alone or in combination.

A catalyst for oxidation/reduction of oxygen may be added to the cathode 13. Examples of the catalyst include, but are not limited to, precious metal-based catalysts such as platinum, gold, silver, palladium, ruthenium, rhodium, and osmium; oxide-based catalysts such as a manganese oxide, an iron oxide, a cobalt oxide, and a nickel oxide; and an organic metal-based catalyst such as cobalt phthalocyanine. Any catalyst for oxidation/reduction of oxygen used in the art may be used.

In addition, the catalyst may be supported on a catalyst support. The catalyst support may be oxide, zeolite, clay-based mineral, carbon, or the like. The oxide may be at least one oxide selected from alumina, silica, zirconium oxide, and titanium dioxide. The oxide may be an oxide including at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon include carbon blacks such as Ketjen black, acetylene black, channel black, and lamp black; graphites such as natural graphite, artificial black, and expandable graphite; activated carbons; and carbon fibers. However, the carbon is not limited to the above examples and any catalyst support used in the art may be used.

The cathode 13 may further include a binder. The binder may include a thermo-plastic resin or a thermosetting resin. Examples of the binder include polyethylene oxide, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer. In this regard, the binder may be used alone or in a combination with another binder. However, the binder is not limited to the above examples and any binder used in the art may be used.

The cathode 13 may be manufactured by mixing the catalyst for oxidation/reduction of oxygen, the conductive material, and the binder and adding an appropriate solvent thereto to prepare a cathode slurry, coating the cathode slurry on a surface of the first current collector 11 and drying the coated first current collector 11 and, selectively, compression-molding the cathode slurry to the first current collector 11 to increase the density of the cathode 13. In addition, the cathode 13 may optionally include a lithium oxide. The catalyst for oxidation/reduction of oxygen may not be optionally used.

The anode 14 may be an anode including lithium and examples thereof include anodes including Li metal, Li metal-based alloys, or materials capable of intercalating and deintercalating lithium. However, materials for the anode 14 are not limited to the above examples and any anode including lithium or a material capable of intercalating and deintercalating lithium, used in the art, may be used. The anode 14 determines the capacity of the lithium air battery.

The anode 14 may be, for example, a lithium metal thin film. The Li metal-based alloy may be, for example, an alloy of lithium with aluminum, tin, magnesium, indium, calcium, titanium, vanadium, or the like.

The electrolyte 15 may be partially or completely impregnated in the cathode 13 with porosity.

In addition, although not shown in FIG. 1A, a separator may be disposed between the cathode 13 and the anode 14. The separator is not particularly limited as long as it has a composition that may withstand use conditions of the lithium air battery. Examples of the separator include polymer nonwoven fabrics such as polypropylene nonwoven fabrics and polyphenylene sulfide nonwoven fabrics; and porous films composed of olefin resins such as polyethylene and polypropylene. At least two of these materials may also be used in a combination.

Figure 1B:
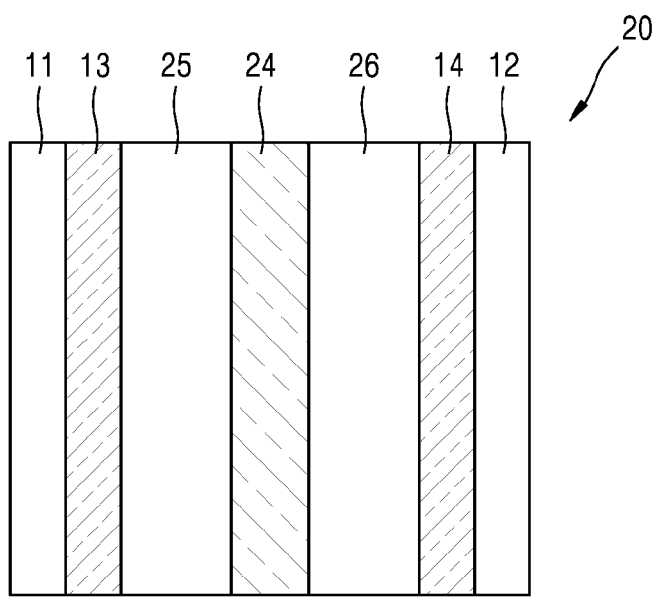
FIG. 1B is a view illustrating a structure of a lithium air battery according to another embodiment.

FIG. 1B is a view illustrating a structure of a lithium air battery 20 according to another embodiment.

Referring to FIG. 1B, the lithium air battery 20 includes the first current collector 11, the second current collector 12, the cathode 13, the anode 14, a lithium ion conductive layer 24 disposed between the cathode 13 and the anode 14, an electrolyte 25 including the compound of Formula 1 described above (a first electrolyte), disposed between the cathode 13 and the lithium ion conductive layer 24, and a second electrolyte 26 disposed between the anode 14 and the lithium ion conductive layer 24.

In FIG. 1B, the anode 14, the second electrolyte 26, and the lithium ion conductive layer 24 may be collectively referred to as a protected anode. The cathode 13, the anode 14, and the first electrolyte 25 that are illustrated in FIG. 1B correspond to the cathode 13, the anode 14, and the first electrolyte 15 that are illustrated in FIG. 1A, and thus, a detailed description thereof is omitted herein.

The lithium ion conductive layer 24 exhibits lithium ion conductivity and includes ion conductive inorganic particles.

Non-limiting examples of the second electrolyte 26 include a solid polymer electrolyte and an inorganic solid electrolyte.

The solid polymer electrolyte may be, for example, a polyethylene oxide membrane, a polyacrylonitrile membrane, or a polyester membrane.

The solid polymer electrolyte may be prepared by, for example, mixing a lithium ion conductive polymer and a lithium salt. The lithium salt may be at least one selected from $LiPF_6$, $LiBF_4$, $LiSbF_6$, $LiAsF_6$, $LiN(SO_2C_2F_5)_2$, $Li(CF_3SO_2)_2N$, $Li(FSO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiF, LiBr, LiCl, LiI, and $LiB(C_2O_4)_2$ (lithium bis(oxalato) borate; LiBOB).

The inorganic solid electrolyte may be, for example, $Cu_3N$, $Li_3N$, or LiPON.

A lithium ion conductive solid electrolyte membrane may be used as the second electrolyte.

The lithium ion conductive solid electrolyte membrane may be a glass-ceramic solid electrolyte or a laminated structure of a glass-ceramic solid electrolyte or a polymer solid electrolyte. The glass-ceramic indicates a polycrystalline material produced by controlled crystallization of base glass.

A material for the lithium ion conductive solid electrolyte membrane may be an inorganic material, for example, lithium ion conductive glass, lithium ion conductive crystals (ceramic or glass-ceramic), or a combination thereof. In terms of chemical stability, the lithium ion conductive solid electrolyte membrane may include an oxide.

When the lithium ion conductive solid electrolyte membrane includes a large amount of lithium ion conductive crystals, it has high ionic conductivity. Thus, the amount of the lithium ion conductive crystals may be, for example, 50 percent by weight (wt %) or more, 60 wt % or more, or 70 wt % or more, with respect to the total weight of the inorganic solid electrolyte membrane.

Examples of the lithium ion conductive crystals include Perovskite crystals with lithium ion conductivity, such as $Li_3N$, LISICONs, and $La_{0.55}Li_{0.35}TiO_3$, $LiTi_2P_3O_{12}$ crystals having a NASICON structure, and glass-ceramic that deposits these crystals.

For example, the lithium ion conductive crystals may be $Li_{1+x+y}(Al, Ga)_x(Ti, Ge)_{2-x}Si_yP_{3-y}O_{12}$ wherein $0 \le x \le 1$, $0 \le y \le 1$, for example, $0 \le x \le 0.4$ and $0 \le y \le 0.6$, or $0.1 \le x \le 0.3$ and $0.1 \le y \le 0.4$. If the lithium ion conductive crystals are crystals not including grain boundaries that inhibit ionic conductivity, the lithium ion conductive crystals may be glass in terms of conductivity. For example, glass-ceramic has essentially no pores or grain boundaries that inhibit ionic conductivity, and, thus, may have high ionic conductivity and chemical stability.

Examples of the lithium ion conductive glass-ceramic include lithium-aluminum-germanium-phosphate (LAGP), lithium-aluminum-titanium-phosphate (LATP), and lithium-aluminum-titanium-silicon-phosphate (LATSP).

For example, when a parent glass having a composition of $Li_2O$—$Al_2O_3$—$TiO_2$—$SiO_2$—$P_2O_5$ is crystallized by heat treatment, a main crystal phase of the parent glass consists of $Li_{1+x+y}Al_xTi_{2-x}Si_yP_{3-y}O_{12}$ wherein $0 \le x \le 1$ and $0 \le y \le 1$. In this regard, x and y may satisfy the conditions: $0 \le x \le 0.4$ and $0 \le y \le 0.6$. In particular, x and y may satisfy the conditions: $0.1 \le x \le 0.3$ and $0.1 \le y \le 0.4$.

The term "pores or grain boundaries that inhibit ionic conductivity" as used herein refers to ionic conductivity-inhibiting materials, such as pores or grain boundaries that reduce the lithium ion conductivity of an inorganic material including lithium ion conductive crystals to a tenth or less with respect to the lithium ion conductivity of the lithium ion conductive crystals in the inorganic material.

The glass-ceramic refers to a material obtained by heat-treating glass to deposit a crystalline phase in a glass phase. The glass-ceramic may include materials consisting of amorphous solid and crystals and also include materials in which all glass phases are phase-transited to crystalline phases, for example, materials in which the amount of crystals is 100 wt %. In the completely (100%) crystallized glass-ceramic, almost no pores exist between crystal particles or in crystals.

The lithium ion conductive solid electrolyte membrane includes a large amount of the glass ceramic, and thus, may have high ionic conductivity. Therefore, 80 wt % or more of lithium ion conductive glass ceramic may be included in the lithium ion conductive solid electrolyte membrane. To obtain higher ionic conductivity, the amount of the lithium ion conductive glass ceramic in the lithium ion conductive solid electrolyte membrane may be 85 wt % or greater or 90 wt % or greater.

A $Li_2O$ component included in the glass-ceramic provides a $Li^+$ ion carrier and is used to obtain lithium ion conductivity. To more easily obtain good ionic conductivity, the amount of the $Li_2O$ component may be from about 12 mole percent (mol %) to about 18 mol %, for example, from about 13 mol % to about 17 mol %, for example, from about 14 mol % to about 16 mol %. While not wishing to be bound by theory, it is understood that when the amount of the $Li_2O$ component is within the range described above, the thermal stability of glass does not deteriorate and the glass-ceramic has high conductivity.

An $Al_2O_3$ component included in the glass-ceramic may increase a thermal stability of a parent glass and also effectively increase lithium ion conductivity such that $Al^{3+}$ ions are introduced into the crystalline phase. To more easily obtain these effects, the amount of the $Al_2O_3$ component may be from about 5 mol % to about 10 mol %, for example, from about 5.5 mol % to about 9.5 mol %, for example, from about 6 mol % to about 9 mol %. While not wishing to be bound by theory, it is understood that when the amount of the $Al_2O_3$ component is within the ranges described above, the thermal stability of glass does not deteriorate and the glass-ceramic has high conductivity.

A $TiO_2$ component included in the glass-ceramic contributes to the formation of glass, is a constituent of the crystalline phase, and is an essential component in glass and the crystals. To glassify the glass-ceramic and more easily obtain high ionic conductivity such that the crystalline phase in a pillar form is deposited from glass, the amount of the $TiO_2$ component may be from about 35 mol % to about 45 mol %, for example, from about 36 mol % to about 43 mol %, for example, from about 37 mol % to about 42 mol %. While not wishing to be bound by theory, it is understood that when the amount of the $TiO_2$ component is within the ranges described above, the thermal stability of glass does not deteriorate and the glass-ceramic has high conductivity.

A $SiO_2$ component included in the glass-ceramic may increase the melting properties and thermal stability of a parent glass and may also contribute to improvement of lithium ion conductivity in such a way that $Si^{4+}$ ions are introduced into the crystalline phase. To more fully obtain these effects, the amount of the $SiO_2$ component may be from about 1 mol % to about 10 mol %, for example, from about 2 mol % to about 8 mol %, for example, from about 3 mol % to about 7 mol %. While not wishing to be bound by theory, it is understood that while not wishing to be bound by theory, it is understood that when the amount of the $SiO_2$ component is within the ranges described above, the thermal stability of glass does not deteriorate and the glass-ceramic has high conductivity.

A $P_2O_5$ component included in the glass-ceramic is used to form glass and is a constituent of the crystalline phase. The amount of the $P_2O_5$ component may be from about 30 mol % to about 40 mol %, for example, from about 32 mol % to about 39 mol %, for example, from about 33 mol % to about 38 mol %. While not wishing to be bound by theory, it is understood that when the amount of the $P_2O_5$ component is within the ranges described above, the crystalline phase is not deposited from glass, and thus, desired characteristics may not be obtained.

In the case of the glass-ceramic consisting of the components described above, glass may be easily obtained by casting a melted glass and the glass-ceramic with the crystalline phase which is obtained by heat-treating the glass may have a high lithium ion conductivity, e.g., about $1 \times 10^{-3}$ siemens per centimeter ($S \cdot cm^{-1}$).

In addition, when a glass-ceramic having a similar crystalline structure in addition to the composition described above is used, part or all of the components may be substituted. For example, the $Al_2O_3$ component may be substituted with a $Ga_2O_3$ component and the $TiO_2$ component may be substituted with a $GeO_2$ component. Moreover, when the glass-ceramic is prepared, a small amount of other raw materials may be added within the ranges that do not largely deteriorate ionic conductivity in order to reduce a melting point of the glass-ceramic or increase the stability of glass.

Figure 1C:
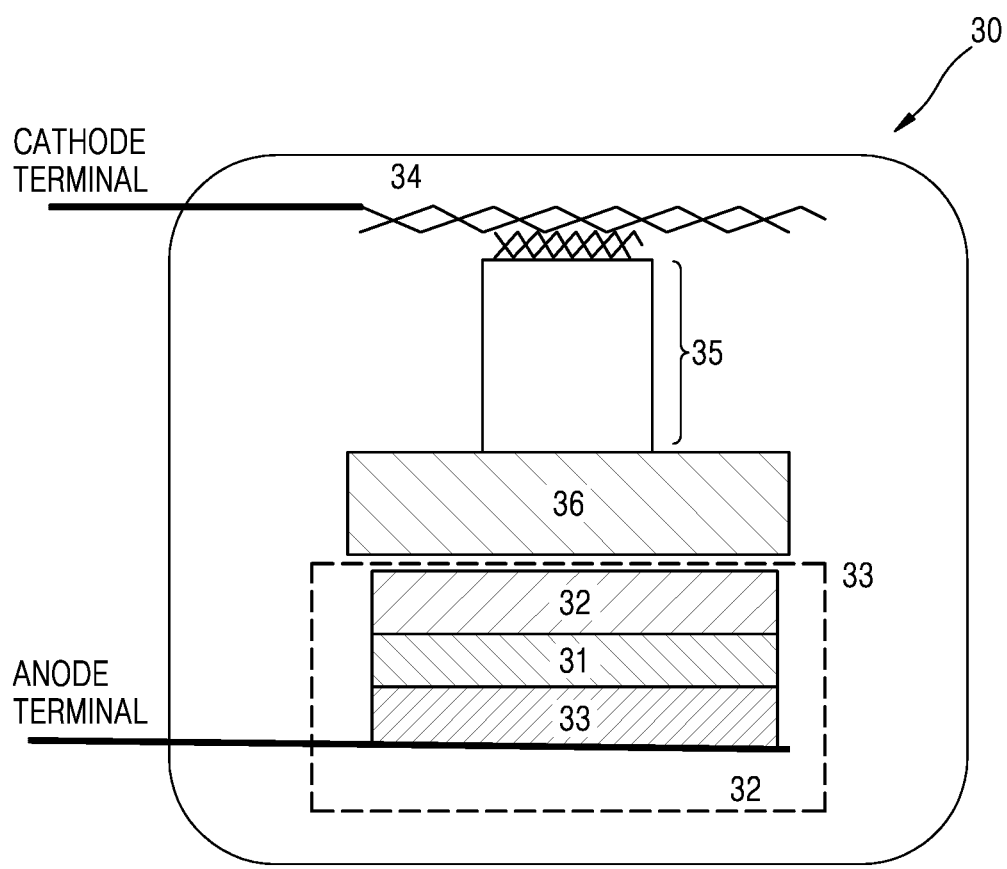
FIG. 1C is a schematic view of a lithium air battery according to another embodiment.

FIG. 1C is a view of a lithium air battery 30 according to an embodiment.

The lithium air battery 30 includes a cathode 35 adjacent to a first current collector 34, which uses oxygen as an active material, an anode 33 adjacent to a second current collector 37 and including lithium, the electrolyte described above (not shown) disposed between the cathode 35 and the anode 33, and a separator 36 on one surface of the cathode 35. A separator 31 and a lithium ion conductive solid electrolyte membrane 32 that are integrated with the electrolyte may be sequentially disposed on one surface of the anode 33. The anode 33, the separator 31, and the lithium ion conductive solid electrolyte membrane 32 may be accommodated in a pouch 38, and the pouch 38 may have a hole in a top end thereof, and thus, may contact the separator 36. The first current collector 34 has porosity and may also serve as a gas diffusion layer which enables diffusion of air. A pressing member (not shown) is disposed on the first current collector 34 so that air is transferred to the cathode 35. A case (not shown) formed of an insulating resin material is disposed between the cathode 35 and the anode 33 so as to electrically separate the cathode 35 from the anode 33. The lithium air battery may be placed in a stainless steel reactor.

The term "air" as used herein is not limited to atmospheric air, and refers to either a gas combination including oxygen or a pure oxygen gas. The broad definition of the term "air" may be applied to all kinds of applications including an air battery, an air cathode, and the like.

The lithium ion conductive solid electrolyte membrane may further include a polymer solid electrolyte, in addition to the glass-ceramic component. The polymer solid electrolyte may be polyethylene oxide doped with a lithium salt. Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like.

The polymer solid electrolyte may form a stacked structure with the glass-ceramic, and the glass-ceramic may be disposed between first and second polymer solid electrolytes including the component described above.

The lithium ion conductive solid electrolyte membrane may have a single layer structure or a multilayer structure.

In the lithium air battery, a ratio ($E_D/E_H$) of an initial charge/discharge efficiency ($E_D$) of the lithium air battery including the corresponding deuterated compound to an initial charge/discharge efficiency ($E_H$) of the lithium air battery including a compound having not been deuterated may be about 1.05 or more.

The operating principle of the lithium air batteries is described next. During discharging of the lithium air battery, lithium derived from the anode reacts with oxygen introduced from the cathode to generate a lithium oxide, and oxygen is reduced (oxygen reduction reaction (ORR)). In contrast, during charging of the lithium air battery, the lithium oxide is reduced, and oxygen is generated by oxidation (oxygen evolution reaction (OER)).

When a non-aqueous electrolyte is used as the electrolyte, a reaction mechanism may be represented by Chemical Equation 1 below:

$$4Li + O_2 \leftrightarrow 2Li_2O \quad E^0 = 2.91 \text{ V}$$

$$2Li + O_2 \leftrightarrow Li_2O_2 \quad E^0 = 3.10 \text{ V} \quad \text{Chemical Equation 1}$$

When an aqueous electrolyte is used as the electrolyte, a reaction mechanism may be represented by Chemical Equation 2 below:

$$4Li + O_2 + 2H_2O \leftrightarrow 4LiOH \quad E^0 = 3.45 \text{ V} \quad \text{Chemical Equation 2}$$

The term "air" as used herein is not limited to atmospheric air, and refers to either a gas combination including oxygen or a pure oxygen gas. The broad definition of the term "air" may be applied to all kinds of applications including an air battery, an air cathode, and the like.

The lithium air battery may be either a lithium primary battery or a lithium secondary battery. The lithium air battery may be in various shapes, and in some embodiments, may have a coin, button, sheet, stack, cylinder, plane, or horn shape. The lithium air battery may be used as a large-scale battery for electric vehicles and the like.

Substituents used in the formulae described above are defined as follows.

The term "alkyl" as used herein refers to a fully saturated branched or non-branched (straight chain or linear) hydrocarbon group.

Non-limiting examples of "alkyl" include methyl, ethyl, n-propyl, iso-propyl, n-butyl, iso-butyl, sec-butyl, n-pentyl, iso-pentyl, neo-pentyl, iso-amyl, n-hexyl, 3-methylhexyl, 2,2-dimethylpentyl, 2,3-dimethylpentyl, and n-heptyl.

At least one hydrogen atom of "alkyl" may be substituted with a halogen atom, a $C_1$-$C_{20}$ alkyl group substituted with a halogen atom (e.g., $CCF_3$, $CHCF_2$, $CH_2F$, $CCl_3$, or the like), a $C_1$-$C_{20}$ alkoxy group, a $C_1$-$C_{20}$ alkoxy alkyl group, a hydroxyl group, a nitro group, a cyano group, an amino group, an alkylamino group, an amidino group, hydrazine, hydrazone, a carboxyl group or a salt thereof, a sulfonyl group, a sulfamoyl group, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

The term "halogen" as used herein includes fluorine, bromine, chlorine, iodine, and the like.

The term "alkoxy group" as used herein refers to "alkyl-O—". In this regard, the term "alkyl" is the same as defined above. Non-limiting examples of the alkoxy group include a methoxy group, an ethoxy group, a propoxy group, a 2-propoxy group, a butoxy group, a tert-butoxy group, a pentyloxy group, a hexyloxy group, a cyclopropoxy group, a cyclohexyloxy group, and the like. At least one hydrogen atom of the alkoxy group may be substituted with the same substituent as that defined with respect to the term "alkyl group" above.

The term "alkoxyalkyl group" as used herein refers to "alkyl-O-alkyl-". In this regard, the terms "alkyl" is the same as defined above. Non-limiting examples of the alkoxyalkyl group include a methoxymethyl group, an ethoxymethyl group, and the like. At least one hydrogen atom of the alkoxyalkyl group may be substituted with the same substituent as that defined with respect to the term "alkyl group" above.

The term "unsubstituted alkenyl group" as used in the formulae above indicates a radical that contains one or more carbon-carbon double bonds at a center or at the end of the unsubstituted alkyl group. Examples of the unsubstituted alkenyl group include an ethenyl group, a propenyl group, a butenyl group, and the like. At least one hydrogen atom of the unsubstituted alkenyl group may be substituted with the same substituent as that defined with respect to the term "alkyl group" above.

The term "unsubstituted alkynyl group" as used in the formulae above indicates a radical that contains one or more carbon-carbon triple bonds at a center or at the end of the alkyl group as defined above. Examples of the unsubstituted alkynyl group include acetylene, propylene, phenylacetylene, naphthylacetylene, iso-propylacetylene, tert-butylacetylene, and diphenylacetylene. At least one hydrogen atom of the unsubstituted alkynyl group may be substituted with the same substituent as that defined with respect to the term "alkyl group" above.

The term "aryl group" used in the formulae above is used alone or in combination and means an aromatic hydrocarbon group having at least one ring.

The term "aryl" also includes a group with an aromatic ring fused to at least one cycloalkyl ring.

Non-limiting examples of the aryl group include a phenyl group, a naphthyl group, and a tetrahydronaphthyl group.

In addition, at least one hydrogen atom of the aryl group may be substituted with the same substituent as that defined with respect to the term "alkyl group" above.

The term "aryloxy group" as used herein refers to "aryl-O—". In this regard, the term "aryl" is the same as defined above. Non-limiting examples of the aryloxy group include phenoxy and the like. At least one hydrogen atom of the aryloxy group may be substituted with the same substituent as that defined with respect to the term "aryl group" above.

The term "aryloxyalkyl group" as used herein refers to "aryl-O-alkyl-". In this regard, the terms "aryl" and "alkyl" are the same as defined above. Non-limiting examples of the aryloxyalkyl group include phenoxymethyl and the like. At least one hydrogen atom of the aryloxyalkyl group may be substituted with the same substituent as that defined with respect to the term "aryl group" above.

The term "arylalkyl group" as used herein refers to "aryl-alkyl". In this regard, the terms "aryl" and "alkyl" are the same as defined above. Non-limiting examples of the arylalkyl group include phenylmethyl (benzyl), phenylethyl (phenethyl), and the like. At least one hydrogen atom of the arylalkyl group may be substituted with the same substituent as that defined with respect to the terms "aryl group" and "alkyl group" above.

The term "heteroaryl group" as used in the formulae above indicates a monocyclic or bicyclic organic compound including at least one heteroatom selected from N, O, P, and S, wherein the rest of the cyclic atoms are all carbon. The heteroaryl group may include, for example, one to five heteroatoms and may include five- to ten-membered rings. In the heteroaryl group, S or N may be present in various oxidized forms.

Non-limiting examples of the monocyclic heteroaryl group include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isoxazol-3-yl group, an isoxazol-4-yl group, an isoxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazin-2-yl group, a pyrazin-4-yl group, a pyrazin-5-yl group, a 2-pyrimidin-2-yl group, a 4-pyrimidin-2-yl group, and a 5-pyrimidin-2-yl group.

The term "heteroaryl group" includes a heteroaromatic ring fused to at least one of aryl, a cycloaliphatic group, and a heterocyclic group.

Non-limiting examples of the bicyclic heteroaryl group include indolyl, isoindolyl, indazolyl, indolizinyl, purinyl, quinolizinyl, quinolinyl, and isoquinolinyl. At least one hydrogen atom of the heteroaryl group may be substituted with the same substituent as that defined with respect to the term "alkyl group" above.

The term "heteroaryloxy group" as used herein refers to "heteroaryl-O—". In this regard, the term "heteroaryl" is the same as defined above. Non-limiting examples of the heteroaryloxy group include 2-pyridyloxy and the like. At least one hydrogen atom of the heteroaryloxy group may be substituted with the same substituent as that defined with respect to the term "heteroaryl group" above.

The term "heteroaryloxyalkyl group" as used herein refers to "heteroaryl-O-alkyl-". In this regard, the terms "heteroaryl" and "alkyl" are the same as defined above. Non-limiting examples of the heteroaryloxyalkyl group include 2-pyridyloxymethyl and the like. At least one hydrogen atom of the heteroaryloxyalkyl group may be substituted with the same substituent as that defined with respect to the terms "heteroaryl group" and "alkyl group" above.

The term "heteroarylalkyl group" as used herein refers to "heteroaryl-alkyl-". In this regard, the terms "heteroaryl" and "alkyl" are the same as defined above. Non-limiting examples of the heteroarylalkyl group include 2-pyridylmethyl and the like. At least one hydrogen atom of the heteroarylalkyl group may be substituted with the same substituent as that defined with respect to the terms "heteroaryl group" and "alkyl group" above.

The term "sulfonyl" indicates R"—$SO_2$— where R" is hydrogen, an alkyl group, an aryl group, a heteroaryl group, an aryl-alkyl group, a heteroaryl-alkyl group, an alkoxy group, an aryloxy group, a cycloalkyl group, or a heterocyclic group.

The term "sulfamoyl group" as used herein includes $H_2NS(O_2)$—, alkyl-$NHS(O_2)$—, $(alkyl)_2NS(O_2)$-aryl-NHS $(O_2)$—, alkyl(aryl)-$NS(O_2)$—, $(aryl)_2NS(O)_2$, heteroaryl-$NHS(O_2)$—, (aryl-alkyl)-$NHS(O_2)$—, or (heteroaryl-alkyl)-$NHS(O_2)$—.

At least one hydrogen atom of the sulfamoyl group may be substituted with the same substituent as that defined with respect to the term "alkyl group" above.

The term "amino group" as used herein refers to a group with a nitrogen atom covalently bonded to at least one carbon or hetero atom. The amino group includes, for example, —$NH_2$ and substituted moieties.

The term "alkylamino group" as used herein includes an alkylamino group in which a nitrogen atom is bound to at least one additional alkyl group and arylamino and diarylamino groups in which a nitrogen atom is bound to at least one independently selected aryl group.

When a group containing a specified number of carbon atoms is substituted, the number of carbon atoms in the resulting "substituted" group is defined as the sum of the carbon atoms contained in the original (unsubstituted) group and the carbon atoms (if any) contained in the substituent. For example, when the term "substituted $C_1$-$C_{30}$ alkyl" refers to a $C_1$-$C_{30}$ alkyl group substituted with $C_6$-$C_{30}$ aryl group, the total number of carbon atoms in the resulting aryl substituted alkyl group is $C_7$-$C_{60}$.

One or more embodiments will now be described in further detail with reference to the following examples. These examples are for illustrative purposes only and are not intended to limit the scope of the one or more embodiments.

EXAMPLES

Example 1: Preparation of Electrolyte

Lithium nitrate ($LiNO_3$) was added to deuterated N,N-dimethylacetamide (DMAc-$d_6$) (>99 atom % D) such that 1.0 molar (M) electrolyte was obtained, thereby completing the preparation of an electrolyte. The amount of the deuterated N,N-dimethylacetamide was about 94 parts by weight based on the total weight of the electrolyte.

Example 2: Preparation of Electrolyte $LiNO_3$ was added to 20 percent by volume (vol %) of N,N-dimethylacetamide and 80 vol % of DMAc-$d_6$ (>99 atom % D) such that 1.0 M electrolyte was obtained, thereby completing the preparation of an electrolyte. The total amount of the deuterated N,N-dimethylacetamide and N,N-dimethylacetamide was about 75.2 parts by weight based on the total weight of the electrolyte. The amount of the deuterated N,N-dimethylacetamide was about 60.16 parts by weight based on the total weight of the electrolyte.

A bond dissociation energy of C-D is about 341.4 kilojoules per mole (kJ/mol), and a bond dissociation energy of C—H is 338.4±1.2 kJ/mol. Thus, the C-D bond is thermodynamically stronger than the C—H bond and has a kinetic isotope effect, resulting in a decrease in chemical reaction rate.

The electrolyte of Example 2 includes 20 vol % of protonated N,N-dimethylacetamide having a bond dissociation energy of about 338.4±1.2 kJ/mol and 80 vol % of a deuterated solvent having a dissociation energy of 341.4 kJ/mol, and is more stable. When deuterated solvent molecules having a C-D bond are used, energy efficiency may further increase after the $1^{st}$ cycle. From the $2^{nd}$ cycle of charging and discharging, oxidation of carbon surfaces occurs, and thus, the effect obtained using such a deuterated solvent is somewhat lower.

Example 3: Preparation of Electrolyte $LiNO_3$ was added to 80 vol % of N,N-dimethylacetamide and 20 vol % of DMAc-$d_6$ (>99 atom % D) such that 1.0 M electrolyte was obtained, thereby completing the preparation of an electrolyte. The total amount of the deuterated N,N-dimethylacetamide and N,N-dimethylacetamide was about 18.8 parts by weight based on the total weight of the electrolyte. The amount of the deuterated N,N-dimethylacetamide was about 3.76 parts by weight based on the total weight of the electrolyte.

Examples 4 and 5: Preparation of Electrolytes

Electrolytes were prepared in the same manner as in Example 1, except that the amounts of the deuterated N,N-dimethylacetamide were about 3 parts by weight and about 95 parts by weight, respectively, based on the total weight of the electrolyte.

Examples 6 to 11: Preparation of Electrolytes

Electrolytes were prepared in the same manner as in Example 1, except that deuterated dimethoxy ethane, deuterated ethylene glycol dimethyl ether ($CH_3OCH_2CH_2OCH_3$: glyme), deuterated diethylene glycol dimethyl ether ($CH_3(OCH_2CH_2)_2OCH_3$: diglyme), deuterated diethylene glycol diethyl ether ($C_2H_5(OCH_2CH_2)_2OC_2H_5$), deuterated triethylene glycol dimethyl ether ($CH_3(OCH_2CH_2)_3OCH_3$), and deuterated triethylene glycol diethyl ether ($C_2H_5(OCH_2CH_2)_3OC_2H_5$) were respectively used instead of the deuterated N,N-dimethylacetamide (DMAc-$d_6$).

Comparative Example 1: Preparation of Electrolyte

An electrolyte was prepared in the same manner as in Example 1, except that dimethyl sulfoxide (DMSO) was used instead of the deuterated N,N-dimethylacetamide.

Comparative Example 2: Preparation of Electrolyte

An electrolyte was prepared in the same manner as in Example 1, except that deuterated dimethyl sulfoxide (DMSO-$d_6$) (>99 atom % D) was used instead of the deuterated N,N-dimethylacetamide.

Comparative Example 3: Preparation of Electrolyte

An electrolyte was prepared in the same manner as in Example 1, except that N,N-dimethylacetamide (DMAc) was used instead of the deuterated N,N-dimethylacetamide.

Comparative Example 4: Preparation of Electrolyte

LiNO$_3$ was added to 20 vol % of dimethyl sulfoxide and 80 vol % of deuterated dimethyl sulfoxide (DMSO-d$_6$) (>99 atom % D) such that 1.0 M electrolyte was obtained, thereby completing the preparation of an electrolyte. The amount of the deuterated dimethyl sulfoxide and dimethyl sulfoxide were about 75.2 parts by weight based on the total weight of the electrolyte. The amount of the deuterated dimethyl sulfoxide was about 60.16 parts by weight based on the total weight of the electrolyte.

Comparative Example 5: Preparation of Electrolyte

LiNO$_3$ was added to 80 vol % of dimethyl sulfoxide and 20 vol % of deuterated dimethyl sulfoxide (DMSO-d$_6$) (>99 atom % D) such that 1.0 M electrolyte was obtained, thereby completing the preparation of an electrolyte. The amount of the deuterated dimethyl sulfoxide and dimethyl sulfoxide were about 18.8 parts by weight based on the total weight of the electrolyte. The amount of the deuterated N,N-dimethyl sulfoxide was about 3.76 parts by weight based on the total weight of the electrolyte.

Example 12: Manufacture of Lithium Air Battery

Multi-walled carbon nanotubes (MWCNTs) (#33100, manufactured by XinNano Materials Inc., Taiwan) and polyethylene oxide (PEO, weight average molecular weight: 600,000) as a binder were mixed in a weight ratio of 98:12 (parts by weight) and N-methylpyrrolidone (NMP) was added thereto in an amount of 100 parts by weight based on the total amount (100 parts by weight) of the MWCNTs and polyethylene oxide to prepare a cathode slurry. Thereafter, the cathode slurry was coated and pressed to obtain a cathode material sheet. The cathode material sheet was pressed on a stainless mesh and vacuum-dried in an oven at 100° C. for 120 minutes to obtain a cathode.

An anode was prepared in such a manner that a hole with a size of 1 cm×1 cm (cm=centimeter) was made in the center of a polypropylene-coated aluminum film with a size of 5 cm×5 cm (thickness: 200 micrometers, μm) and then closed by a LATP film with a size of 1.4 cm×1.4 cm (Li$_{1+x+y}$Al$_x$Ti$_{2-x}$Si$_y$P$_{3-y}$O$_{12}$ wherein 0≤x≤2 and 0≤y≤3, thickness: 150 μm, manufactured by Ohara Corporation) to prepare a first Al film that was partially formed of LATP. Next, a second Al film with a size of 5 cm×5 cm, a Cu current collector (thickness: 20 μm), an Li foil with a size of 1.4 cm×1.4 cm (thickness: 100 μm), a Whatman glass fiber separator impregnated with the electrolyte of Example 1 (1M LiTFSI), and the prepared first Al film were sequentially stacked, vacuum-heated, and attached to one another, thereby obtaining an Al pouch-type protected lithium anode.

The protected lithium anode was mounted in a stainless steel case, and the cathode with a Whatman glass fiber separator disposed on a surface thereof opposite to the anode was set to face the anode. Subsequently, the electrolyte, prepared according to Example 1, was injected between the cathode and the anode, a foamed nickel plate was disposed on the cathode, and a pressing member allowing air to reach the cathode was pressed thereon to fix a cell, thereby completing the manufacture of a lithium air battery.

Examples 13 to 22: Manufacture of Lithium Air Batteries

Lithium air batteries were manufactured in the same manner as in Example 12, except that the electrolytes prepared according to Examples 2 to 11 were respectively used instead of the electrolyte of Example 1.

Comparative Examples 6 to 10: Manufacture of Lithium Air Batteries

Lithium air batteries were manufactured in the same manner as in Example 3, except that the electrolytes prepared according to Comparative Examples 1 to 5 were respectively used instead of the electrolyte of Example 1.

Evaluation Example 1: Evaluation of Charge/Discharge Characteristics

Each of the lithium air batteries manufactured according to Examples 12 to 14 and Comparative Examples 6 to 8 was placed in a chamber filled with 1 atmosphere (atm) of oxygen at 25° C. and 1 atm in an oxygen atmosphere, discharged at a constant current of 0.24 milliamperes per square centimeter (mA/cm$^2$) at 60° C. until the voltage reached 2 volts (V) (vs. Li), and then charged at the same current until the voltage reached 4.4 V (0.2 C-Discharge (0.24 mA/cm$^2$), 0.2 C-Charge.).

Figure 2:
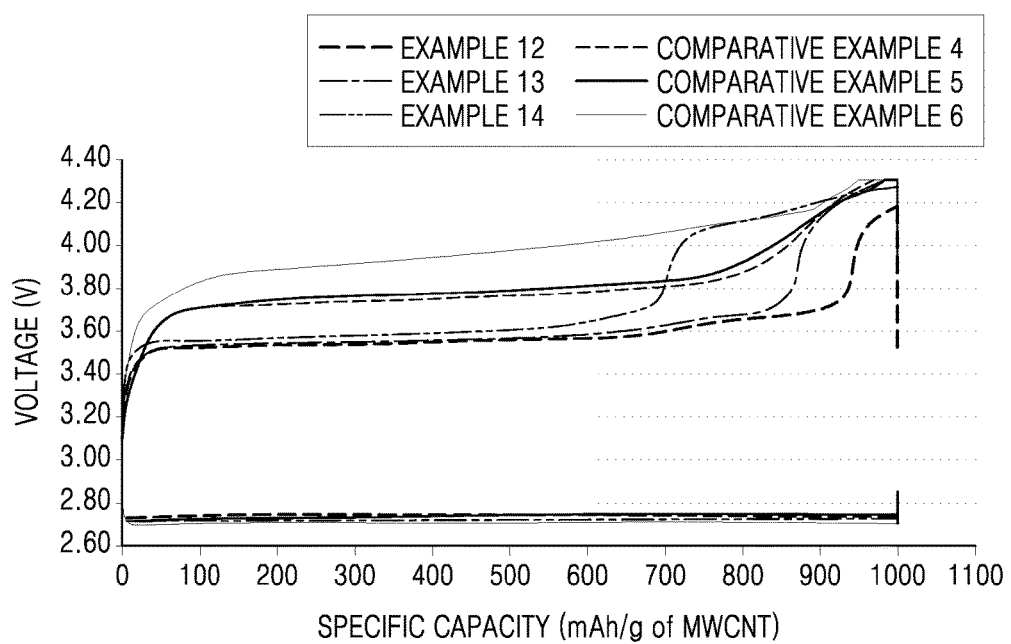
FIG. 2 is a graph of voltage (volts, V) versus specific capacity (milliampere hours per gram of multiwall carbon nanotubes, mAh/g of MWCNT) showing voltage profiles of lithium air batteries manufactured according to Examples 12 to 14 and Comparative Examples 4 to 6.

A part of the charge/discharge test results of the lithium air batteries of Examples 12 to 14 and Comparative Examples 4 to 6 is shown in FIG. 2 and Table 1 below. A discharge capacity is defined as a discharge capacity per total weight of the cathode.

A charge/discharge efficiency was calculated according to Equation 2 below shown in Table 1 below.

$$\text{Charge/discharge efficiency (\%)} = \{(1^{st} \text{ cycle discharge capacity})/(1^{st} \text{ cycle charge capacity})\} \times 100 \qquad \text{Equation 2}$$

TABLE 1

| | Charge/discharge efficiency after 1$^{st}$ cycle (%) |
|---|---|
| Example 12 | 76.2 |
| Example 13 | 75.3 |
| Example 14 | 72.7 |
| Comparative Example 6 | 72.1 |
| Comparative Example 7 | 71.5 |
| Comparative Example 8 | 68.0 |

TABLE 2

| | Charge/discharge efficiency after 2$^{nd}$ cycle (%) |
|---|---|
| Example 12 | 73.2 |
| Example 13 | 71.9 |
| Example 14 | 70.4 |

Referring to FIG. 2 and Table 1, the lithium air batteries of Examples 12 to 14 exhibited more stable charge/discharge characteristics and enhanced initial charge/discharge efficiency as compared to the lithium air batteries of Comparative Examples 6 to 8. Also, referring to Table 2, the lithium air batteries of Examples 12 to 14 exhibited good charge/discharge efficiency after $2^{nd}$ cycle.

In addition, discharge capacities of the lithium air batteries of Examples 15 to 22 were evaluated.

As a result of evaluation, the lithium air batteries of Examples 15 to 22 exhibited charge/discharge characteristics similar to those of the lithium air battery of Example 12.

Evaluation Example 2: Evaluation of Average Charging Voltage

Each of the lithium air batteries manufactured according to Examples 12 to 14 and Comparative Examples 6 to 8 was placed in a chamber filled with 1 atm of oxygen at 25° C. and 1 atm in an oxygen atmosphere, discharged at a constant current of 0.24 mA/cm² at 60° C. until the voltage reached 2 V (vs. Li), and then charged at the same current until the voltage reached 4.4 V (0.2 C-Discharge (0.24 mA/cm²), 0.2 C-Charge.).

An average charging voltage per each cycle part of the charge/discharge test results of the lithium air batteries of Examples 12 to 14 and Comparative Examples 4 to 6 is shown in Table 3 below.

TABLE 3

|  | $1^{st}$ cycle Average charging voltage (V) | $2^{nd}$ cycle Average charging voltage (V) |
| --- | --- | --- |
| Example 12 | 3.601 | 3.732 |
| Example 13 | 3.651 | 3.809 |
| Example 14 | 3.752 | 3.901 |
| Comparative Example 6 | 3.841 | 3.854 |
| Comparative Example 7 | 3.842 | 3.858 |
| Comparative Example 8 | 4.013 | 3.916 |

Referring to Table 3, the lithium air batteries of Example 12 to 14 have a lower average charging voltage values than those of the lithium air batteries of Comparative Examples 6 to 8. The average charging voltage provides information on potential degree of oxidation of discharged products, and a decrease in average charging voltage means an improvement in performance of a cathode in terms of carbon oxidation and solvent dissociation.

As is apparent from the foregoing description, when an electrolyte for a lithium air battery, according to an embodiment, is used, a side reaction at a cathode is suppressed and stability of the battery is improved. Thus, a lithium air battery having enhanced cycle characteristics may be manufactured using the electrolyte.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. An electrolyte for a lithium air battery, the electrolyte comprising at least one deuterated compound selected from deuterated N,N-dimethylacetamide, deuterated N-methylacetamide, a deuterated glyme compound, and a compound represented by Formula 1:

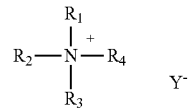

Formula 1 wherein each of $R_1$ to $R_4$ is independently a hydrogen atom, a deuterium atom, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkoxyalkyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ aryloxyalkyl group, a substituted or unsubstituted $C_7$-$C_{30}$ arylalkyl group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ heteroaryloxyalkyl group, a substituted or unsubstituted $C_4$-$C_{30}$ heteroarylalkyl group, a substituted or unsubstituted $C_4$-$C_{30}$ cycloalkyl group, or a substituted or unsubstituted $C_3$-$C_{30}$ heterocycloalkyl group;

$R_1$ and $R_2$ or $R_3$ and $R_4$ are optionally linked to each other to form a ring;

Y is an anion; and at least one of $R_1$ to $R_4$ is substituted with a deuterium atom, provided that tetramethyl ammonium cation is excluded.

2. The electrolyte of claim 1, wherein the deuterated glyme compound is at least one compound selected from deuterated dimethoxy ethane, deuterated ethylene glycol dimethyl ether ($CH_3OCH_2CH_2OCH_3$), deuterated diethylene glycol dimethyl ether ($CH_3(OCH_2CH_2)_2OCH_3$), deuterated diethylene glycol diethyl ether ($C_2H_5(OCH_2CH_2)_2OC_2H_5$), deuterated triethylene glycol dimethyl ether ($CH_3(OCH_2CH_2)_3OCH_3$), and deuterated triethylene glycol diethyl ether ($C_2H_5(OCH_2CH_2)_3OC_2H_5$).

3. The electrolyte of claim 1, wherein the deuterated N,N-dimethylacetamide is at least one compound selected from $CD_3CON(CD_3)_2$, $CH_3CON(CD_3)_2$, $CHD_2CON(CD_3)_2$, $CH_2DCON(CD_3)_2$, $CH_3CON(CD_3)(CH_3)$, $CH_3CON(CD_2H)(CH_3)$, $CH_3CON(CDH_2)(CH_3)$, $CH_3CON(CD_2H)_2$, $CH_3CON(CDH_2)_2$, $CHD_2CON(CD_3)(CH_3)$, $CHD_2CON(CD_2H)(CH_3)$, $CHD_2CON(CDH_2)(CH_3)$, $CHD_2CON(CD_2H)_2$, $CH_3CON(CDH_2)_2$, $CH_2DCON(CD_3)(CH_3)$, $CH_2DCON(CD_2H)(CH_3)$, $CH_2DCON(CDH_2)(CH_3)$, $CH_2DCON(CD_2H)_2$, and $CH_2DCON(CDH_2)_2$.

4. The electrolyte of claim 1, wherein the compound of Formula 1 comprises a cation selected from groups represented by Formula 2:

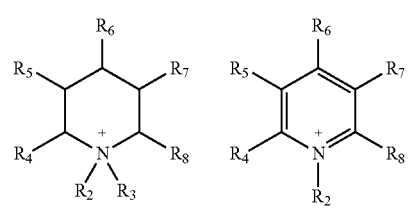

Formula 2

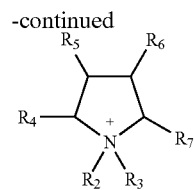

wherein each of $R_2$ to $R_8$ is independently a hydrogen atom, a deuterium atom, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkoxyalkyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ aryloxyalkyl group, a substituted or unsubstituted $C_7$-$C_{30}$ arylalkyl group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ heteroaryloxyalkyl group, a substituted or unsubstituted $C_4$-$C_{30}$ heteroarylalkyl group, a substituted or unsubstituted $C_4$-$C_{30}$ cycloalkyl group, or a substituted or unsubstituted $C_3$-$C_{30}$ heterocycloalkyl group; and at least one of $R_2$ to $R_8$ is substituted with a deuterium atom.

5. The electrolyte of claim 1, wherein in Formula 1, $Y^-$, is selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(FSO_2)_2N^-$, $(C_2F_5SO_2)_2N^-$, $(C_2F_5SO_2)(CF_3SO_2)N^-$, and $(CF_3SO_2)_2N^-$.

6. The electrolyte of claim 1, wherein the deuterated compound has a deuterium substitution degree of about 50% to about 100%.

7. The electrolyte of claim 1, wherein an amount of the deuterated compound is from about 3 parts by weight to about 95 parts by weight based on 100 parts by weight of the electrolyte.

8. The electrolyte of claim 1, wherein the compound of Formula 1 is a deuterated product of a compound comprising:
at least one cation selected from tetraethyl ammonium cation, trimethylpropyl ammonium cation, N,N-diethyl-N-methyl-N-(2-methoxyethyl)ammonium cation, N-ethyl-N,N-dimethyl-N-(2-methoxyethyl)ammonium cation, 1-butyl-1-methylpyrrolidinium cation, 1-methyl-1-(2-methoxyethyl)pyrrolidinium cation, 1-methyl-1-(3-methoxypropyl)pyrrolidinium cation, 1-methyl-1-pentylpyrrolidinium cation, N-propyl-N-methylpyrrolidinium cation, N-propyl-N-methylpiperidinium cation, and N-ethyl-N-methylpiperidinium cation; and
at least one anion selected from $BF_4^-$, $PF_6^-$, $AsF_6^-$, $SbF_6^-$, $AlCl_4^-$, $HSO_4^-$, $C_{10}4^-$, $CH_3SO_3^-$, $CF_3CO_2^-$, $Cl^-$, $Br^-$, $I^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

9. The electrolyte of claim 1, further comprising a non-aqueous organic solvent.

10. The electrolyte of claim 9, wherein the non-aqueous organic solvent further comprises at least one compound selected from N,N-dimethylacetamide, N-methylacetamide dimethyl sulfoxide, methyl butyl ether, diethyl ether, ethyl butyl ether, dibutyl ether, polyethylene glycol dimethyl ether, tetraethylene glycol dimethyl ether, cyclohexanone, dioxane, dimethoxy ethane, 2-methyltetrahydrofuran, 2,2-dimethyltetrahydrofuran, 2,5-dimethyltetrahydrofuran, tetrahydrofuran, methyl acetate, ethyl acetate, n-propyl acetate, dimethyl acetate, methyl propionate, ethyl propionate, methyl formate, ethyl formate, dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate, γ-butyrolactone, decanolide, valerolactone, mevalonolactone, caprolactone, diglyme, triglyme, tetraglyme, acetonitrile, benzonitrile, nitromethane, nitrobenzene, triethyl amine, triphenyl amine, tetraethylene glycol diamine, dimethylformamide, diethylformamide, N-methylpyrrolidone, dimethyl sulfone, tetramethylene sulfone, triethylphosphine oxide, 1,3-dioxolane, and sulfolane.

11. The electrolyte of claim 1,
wherein the electrolyte comprises a mixture of deuterated N,N-dimethylacetamide and N, N-dimethylacetamide,
wherein an amount of the deuterated N,N-dimethylacetamide in the mixture is from about 0.1 parts by weight to about 99.99 parts by weight based on a total weight (100 parts by weight) of the deuterated N,N-dimethylacetamide and N,N-dimeth lacetamide.

12. The electrolyte of claim 11, wherein the amount of the deuterated N,N-dimethylacetamide in the mixture is from about 20 parts by volume to about 80 parts by volume based on the total volume (100 parts by volume) of the deuterated N, N-dimethylacetamide and N, N-dimethylacetamide.

13. The electrolyte of claim 1, further comprising a lithium salt.

14. The electrolyte of claim 13, wherein the lithium salt is at least one compound selected from $LiNO_3$, $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, $LiF$, $LiBr$, $LiCl$, $LiOH$, $LiI$, $LiB(C_2O_4)_2$, $Li(FSO_2)_2N$, $Li(CF_3SO_2)_2N$, $Li(C_2F_5SO_2)_2N$, $LiN(C_pF_{2p+1}SO_2)(C_qF_{2q+1}SO_2)$ wherein p and q are different numbers and are each independently an integer of 1 to 20, $LiN((SO_2)_2C_pF_{2p})$ wherein p is an integer of 1 to 10, $Li(C_6F_5SO_2)_2N$, $Li(C_{10}F_7SO_2)_2N$, $Li(C_6F_5SO_2)(C_{10}F_7SO_2)N$, $LiN(C_6F_5SO_2)(C_pF_{2p+1}SO_2)$, wherein p is an integer of 1 to 10, and $LiN(C_{10}F_7SO_2)(C_pF_{2p+1}SO_2)$, wherein p is an integer of 1 to 10.

15. A lithium air battery comprising an anode, a cathode, and at least one selected from an electrolyte comprising a deuterated compound and a reaction product thereof,
wherein the deuterated compound is at least one compound selected from deuterated N,N-dimethylacetamide, deuterated N-methylacetamide, a deuterated glyme compound, and a compound represented by Formula 1:

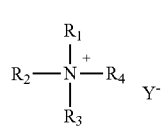

Formula 1 wherein
each of $R_1$ to $R_4$ is independently a hydrogen atom, a deuterium atom, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkoxyalkyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ aryloxyalkyl group, a substituted or unsubstituted $C_7$-$C_{30}$ arylalkyl group, a substituted or unsubstituted $C_3$-$C_{30}$ heteroaryl group, a substituted or unsubstituted $C_3$-$C_{30}$ heteroaryloxy group, a substituted or unsubstituted $C_4$-$C_{30}$ heteroaryloxyalkyl group, a substituted or unsubstituted $C_4$-$C_{30}$ heteroarylalkyl group, a substituted or unsubstituted $C_4$-$C_{30}$ cycloalkyl group, or a substituted or unsubstituted $C_3$-$C_{30}$ heterocycloalkyl group;

$R_1$ and $R_2$ or $R_3$ and $R_4$ are optionally linked to each other to form a ring;

Y is an anion; and at least one of $R_1$ to $R_4$ is substituted with a deuterium atom.

16. The lithium air battery of claim 15, wherein the electrolyte is partially or completely impregnated in the cathode.

17. The lithium air battery of claim 15, further comprising a lithium ion conductive layer comprising a plurality of ion conductive inorganic particles disposed between the anode and the electrolyte.

18. The lithium air battery of claim 17, wherein the ion conductive inorganic particles are at least one selected from a glassy active metal ion conductor, an amorphous active metal ion conductor, a ceramic active metal ion conductor, and a glass-ceramic active metal ion conductor.

19. The lithium air battery of claim 17, wherein the ion conductive inorganic particles are at least one selected from $Li_{1+x+y}Al_xTi_{2-x}Si_yP_{3-y}O_{12}$ wherein $0<x<2$ and $0\leq y<3$, $BaTiO_3$, $Pb(Zr,Ti)O_3$, $Pb_{1-x}La_xZr_{1-y}Ti_yO_3$ wherein $0\leq x<1$ and $0\leq y<1$, $PB(Mg_3Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate, lithium titanium phosphate ($Li_xTi_y(PO_4)_3$ wherein $0<x<2$ and $0<y<3$), lithium aluminum titanium phosphate ($Li_xAl_yTi_z(PO_4)_3$ wherein $0<x<2$, $0<y<1$, and $0<z<3$), $Li_{1+x+y}(Al,Ga)_x(Ti, Ge)_{2-x}Si_yP_{3-y}O_{12}$ wherein $0\leq x\leq 1$ and $0\leq y\leq 1$, lithium lanthanum titanate ($Li_xLa_yTiO_3$ wherein $0<x<2$ and $0<y<3$), lithium germanium thiophosphate ($Li_xGe_yP_zS_w$ wherein $0<x<4$, $0<y<1$, $0<z<1$, and $0<w<5$), lithium nitride ($Li_xN_y$ wherein $0<x<4$ and $0<y<2$), $SiS_2$($Li_xSi_yS_z$) glass wherein $0<x<3$, $0<y<2$, and $0<z<4$, $P_2S_5$($Li_xP_yS_z$) glass wherein $0<x<3$, $0<y<3$, and $0<z<7$, $Li_2O$, $LiF$, $LiOH$, $Li_2CO_3$, $LiAlO_2$, $Li_2O$—$Al_2O_3$—$SiO_2$—$P_2O_5$—$TiO_2$—$GeO_2$-based ceramics, and Garnet-based ceramics ($Li_{3+x}La_3M_2O_{12}$ wherein $0\leq x\leq 5$ and M=Te, Nb, or Zr).

20. The lithium air battery of claim 17, further comprising a second electrolyte disposed between the anode and the lithium ion conductive layer.

21. The lithium air battery of claim 20, wherein the second electrolyte is a solid polymer electrolyte or an inorganic solid electrolyte.

22. The lithium air battery of claim 15, wherein a ratio ($E_D$/$E_H$) of an initial charge/discharge efficiency ($E_D$) of the lithium air battery comprising the corresponding deuterated compound to an initial charge/discharge efficiency ($E_H$) of the lithium air battery comprising a compound having not been deuterated is about 1.05 or more.

* * * * *